US009331987B2

(12) United States Patent
Daly, Jr. et al.

(10) Patent No.: US 9,331,987 B2
(45) Date of Patent: *May 3, 2016

(54) VIRTUAL STORAGE SYSTEM AND FILE ENCRYPTION METHODS

(71) Applicant: DigitalMailer, Inc., Herndon, VA (US)

(72) Inventors: Ronald M Daly, Jr., Centreville, VA (US); Leonard Giambalvo, Fort Mill, SC (US); Robert Jacob Smilie, Concord, NC (US)

(73) Assignee: Virtual StrongBox, Cornelius, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,797

(22) Filed: Apr. 6, 2015

(65) Prior Publication Data

US 2015/0222610 A1    Aug. 6, 2015

Related U.S. Application Data

(63) Continuation of application No. 13/752,023, filed on Jan. 28, 2013, now Pat. No. 9,003,183.

(51) Int. Cl.
*G06F 21/80* (2013.01)
*H04L 29/06* (2006.01)
*G06F 21/62* (2013.01)

(52) U.S. Cl.
CPC ........ *H04L 63/0457* (2013.01); *G06F 21/6218* (2013.01); *G06F 21/80* (2013.01); *H04L 63/0471* (2013.01)

(58) Field of Classification Search
USPC .......................................................... 713/165
See application file for complete search history.

(56) References Cited

U.S. PATENT DOCUMENTS

| 2008/0172428 | A1 | 7/2008 | Stokes | |
|---|---|---|---|---|
| 2010/0274772 | A1 | 10/2010 | Samuels | |
| 2012/0185653 | A1 | 7/2012 | Peters | |
| 2013/0110787 | A1 | 5/2013 | Garimella | |
| 2013/0326117 | A1* | 12/2013 | Aune | G06F 3/0608 711/103 |
| 2014/0156705 | A1* | 6/2014 | Beecham | G06F 21/6218 707/783 |

* cited by examiner

*Primary Examiner* — Tu Nguyen
(74) *Attorney, Agent, or Firm* — Brundidge & Stanger, P.C.

(57) ABSTRACT

A virtual storage system in data communication with a user computing device via a communication network and file encryption methods for encrypting electronic documents to be uploaded into a virtual storage system where the virtual storage system includes at least one processor which captures a data stream corresponding to an electronic document retrieved from an external system, to be uploaded to the virtual storage system, and creates at least one encryption parameter and encrypts the data stream captured using the at least one encryption parameter created. The virtual storage system further includes a plurality of redundant physical storage devices in data communication with the at least one processor and each configured to store the encrypted data stream corresponding to the electronic document.

20 Claims, 10 Drawing Sheets

VIRTUAL STORAGE SYSTEM AND FILE ENCRYPTION METHODS

CROSS-REFERENCE TO RELATED APPLICATIONS

The present application is a Continuation Application of U.S. application Ser. No. 13/752,023, filed on Jan. 28, 2013 and relates to co-pending U.S. application Ser. No. 13/751,228, filed on Jan. 28, 2013; co-pending U.S. application Ser. No. 13/752,008, filed on Jan. 28, 2013; and co-pending U.S. application Ser. No. 13/752,043 filed on Jan. 28, 2013, the entire disclosures of which are incorporated herein by reference.

BACKGROUND OF THE INVENTION

1. Field of the Invention

The present invention relates to a virtual storage system. More particularly, the present invention relates to a virtual storage system and file encryption methods implemented by the virtual storage system.

2. Description of the Related Art

Virtual storage systems have become a popular alternative for storing files, thereby eliminating the need to install physical storage devices and minimizing file storage costs. A virtual storage system is an online storage system where data is stored in virtual storage pools. The pools are hosted by third parties that operate large data centers. The third parties virtualize resources in servers and present the resources as virtual storage pools for users to store files, for example. The virtual storage system is accessed through a web application programming interface (API), a gateway or a Web-based user interface (UI), for example. A typical virtual storage system (e.g., a cloud-type storage system) has several disadvantages which create security concerns. For example, the storage location of the files stored therein may be unknown to both third party hosting companies and/or users of the virtual storage system. In addition, the typical virtual storage system can be easily accessed over a communication network (e.g., the Internet) using simple single-factor authentication processes for access thereof. The typical virtual storage system does not encrypt files that are stored on their servers which makes the files easily visible to internal employees and hackers. Further, the typical virtual storage system is not PCI Compliant (PCI DSS) a proprietary information security standard for organizations that handle cardholder information for the major debit, credit, prepaid, e-purse, ATM, and POS cards. Further, once any file is stored on the virtual storage system they become property of the virtual storage system provider and are no longer user-owned; therefore the files can be used for other purposes, such as data mining without user permission.

Online banking systems provide resources to enable users to conduct banking transactions electronically from a personal computer, for example. Online banking transactions include monitoring accounts, conducting money transfers, applying for loans, submitting loan payments, etc. However, users are required to visit the bank in person, to conduct certain transactions such as depositing documents into a safe deposit box which is an individually secured container held in a bank vault, for example. The safe deposit box is used to store valuable possessions, such as jewelry, currency, marketable securities, and important documents (e.g., bank statements, wills, passports, property deeds, insurance policies, photographs and birth certificates). Bank personnel typically open the bank vault with a key and a user is required to produce an assigned key to open the safe deposit box.

Currently, online banking systems fail to allow users to store important documents electronically, and also fail to allow users to retrieve, view and share these documents electronically outside of the bank environment, when desired.

SUMMARY OF THE INVENTION

The present invention obviates the above-mentioned disadvantages by providing a virtual storage system that encrypts electronic documents retrieved from an external system (e.g., an online banking system), to thereby enable a user to store important documents in a known storage location within the virtual storage system.

The present invention relates to virtual storage system and file encryption methods implemented by the virtual storage system.

Further, the virtual storage system of the present invention employs a multi-factor authentication process for verifying user access rights, via a specifically-designed application programming interface (API), for example, that can be installed at a user computing device, thereby providing a maximum security level of file storage for the user.

The virtual storage system of the present invention is also PCI Compliant following a proprietary information security standard to allow storage of cardholder information for the major debit, credit, prepaid, e-purse, ATM, and POS cards.

In addition, the virtual storage system locks each file with encryption as it is uploaded or copied, and only the user-owner holds the key (i.e., access rights) to retrieve the file, thereby leaving ownership of the file with the user-owner at all times and providing extra security protection from unauthorized individuals.

The present invention is a virtual storage system in data communication with a user computing device via a communication network. The virtual storage system comprising at least one processor configured to capture a data stream corresponding to an electronic document retrieved from an external system, to be uploaded to the virtual storage system, and create at least one encryption parameter and encrypt the data stream captured using the at least one encryption parameter created, and a plurality of redundant physical storage devices in data communication with the at least one processor and each configured to store the encrypted data stream corresponding to the electronic document.

Further, the present invention is a method implemented by computer system to effect the encryption of electronic documents to be uploaded into a virtual storage system including a plurality of redundant physical storage devices and in data communication via a communication network, with an external system. The method comprising receiving input data for accessing the virtual storage system directly or indirectly via the external system, selecting an electronic folder of a plurality of folders within the virtual storage system to receive an electronic document to be uploaded from the external system, and selecting the electronic document to be uploaded, initiating an uploading process for uploading the electronic document, capturing a data stream corresponding to the electronic document to be uploaded, while performing the uploading process, and storing the data stream captured within the virtual storage system, determining whether the uploading process is complete, creating at least one encryption parameter, when it is determined that the uploading process is complete, and encrypting the data stream captured using the at least one encryption parameter created, and storing the encrypted data stream captured within the virtual storage system.

Further, the present invention is a method implemented by computer system to effect the encryption of electronic documents to be uploaded into a virtual storage system including a plurality of redundant physical storage devices and in data communication via a communication network, with external system. The method comprising receiving input data for accessing the virtual storage system directly or indirectly via the external system, selecting an electronic folder of a plurality of folders within the virtual storage system to receive an electronic document to be uploaded from the external system, and selecting the electronic document to be uploaded, initiating an uploading process for uploading the electronic document, capturing a segment of a data stream corresponding to the electronic document to be uploaded, while performing the uploading process, and storing the segment of the data stream captured within the virtual storage system, creating at least one encryption parameter, and encrypting the segment of the data stream captured using the at least one encryption parameter created, and storing the encrypted segment of the data stream captured within the virtual storage system, determining whether the uploading process is complete, and capturing and encrypting another segment of the data stream when it is determined that the uploading process is not complete.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Specific details are given in the following description to provide a thorough understanding of the embodiments. However, it will be understood by one of ordinary skill in the art that the embodiments may be practiced without these specific details. For example, systems, networks, processes, and other components may be shown as components in block diagram form in order not to obscure the embodiments in unnecessary detail. Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The present invention as will be described in greater detail below provides a method for copying electronic documents, (e.g., electronic banking statements) into a virtual storage system and system implementing the method. The present invention provides various embodiments as described below. However it should be noted that the present invention is not limited to the embodiments described herein, but could extend to other embodiments as would be known or as would become known to those skilled in the art.

Figure 1:
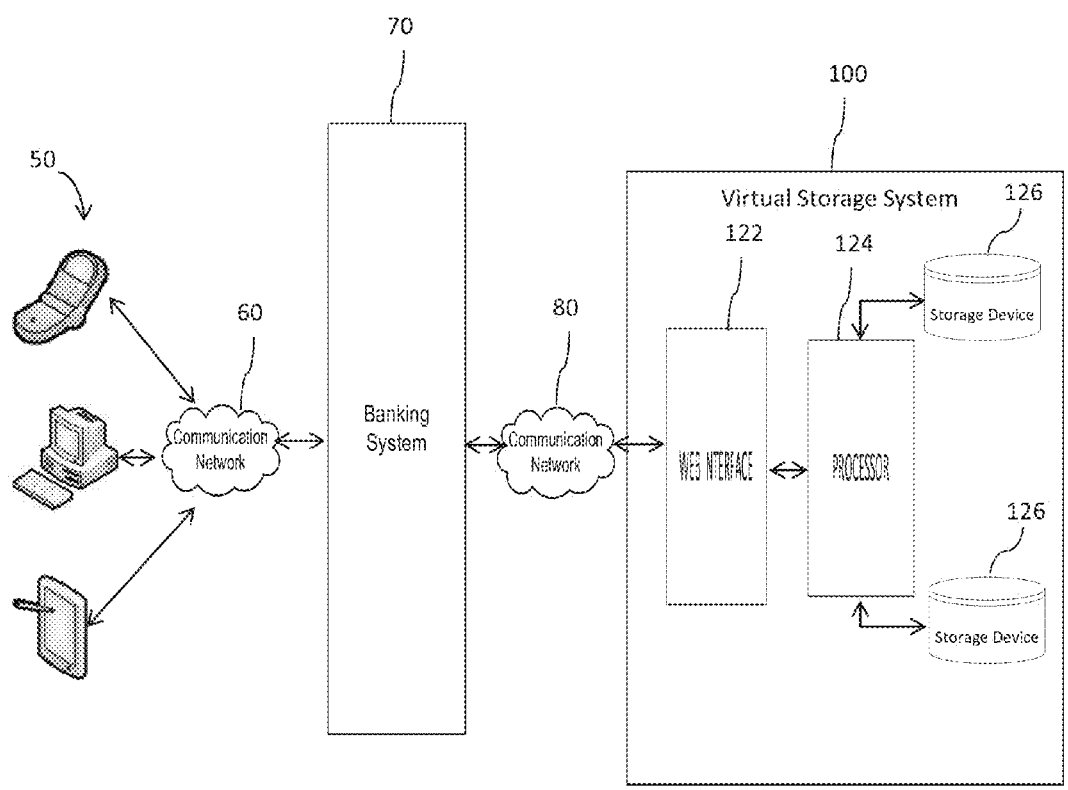
FIG. 1 is a block diagram of a virtual storage system that can be implemented within one or more embodiments of the present invention.

FIG. 1 is a block diagram of a virtual storage system implemented within one or more embodiments of the present invention. In FIG. 1, a user at a user computing device 50 is configured to access, via a communication network 60, an external system i.e., an online document retrieval and storage system such as a banking system 70 to perform online banking transactions, such as viewing bank accounts and bank statements, applying for loans, and other transactions. According to one or more embodiments, the user computing device 50 includes at least one of a mobile phone or smart phone, a personal computer or laptop, or a personal digital assistant (PDA) or tablet. The present invention is not limited to any particular type of user computing device 50, and may vary accordingly.

The user accesses the banking system 70 by inputting input data including identification and log-in information such as a user ID and password via a user interface (UI) of the user computing device 50. Once the identification/log-in information is received at a banking application of the banking system 70, the banking system 70 retrieves the user's banking information and displays the banking information via a display of the user computing device 50. The banking system 70 is configured to receive the input data and provide the user with electronic documents (e.g., bank statements) in webpage format or any other format over the communication network 60. The banking system 70 communicates via a communication network 80, with a virtual storage system 100 described in detail below.

The communication networks 60 and 80 include a wired or wireless network for data communication. The data communication across the communication networks 60 and 80 is achieved by using web services technology including for example, Web services Description Language (WSDL). The communication networks 60 and 80 may include any subsystem for exchanging data such as the Internet, intranet, extranet, wide area network (WAN), local area network (LAN), Restful web services, JAVAScript Object Notation (JSON), Extensible Mark-up Language (XML)-based communication network, Simple Object Access Protocol (SOAP)-based Services and satellite communication network. Further, the communication networks 60 and 80 can be other types of networks such as interactive television (ITV). According to one or more embodiments, the communication networks 60 and 80 may be the same or different types of networks.

The virtual storage system 100 is a user-specific storage system which allows each user to have a secure access to their files stored within the virtual storage system 100. In addition, the virtual storage system 100 encrypts each electronic document as it is retrieved from the external system, and only the user-owner can access the electronic document thereby leaving ownership of the files within the virtual storage system 100 with the user-owner at all times.

According to one or more embodiments, the virtual storage system 100 includes a web interface 122 for interfacing with the external system (i.e., the banking system 70) over the communication network 80. The web interface 122 provides a secure connection to the virtual storage system 100. According to one or more embodiments, the web interface 122 is a specifically-designed application programming interface (API), for example, which performs authentication of the user or the external system (e.g., the banking system 70) at multiple levels. A secure connection is made between the banking system 70 and the virtual storage system 100 on a transport layer level, for example. According to one or more embodiments, a transport layer security (TLS) or secure sockets layer (SSL) cryptographic protocol may be employed to provide secure communication over the communication networks 60 and 80. According to one or more embodiments, the web interface 122 is a web application programming interface (API), a gateway or a Web-based user interface (UI), for example.

According to one or more embodiments, the virtual storage system 100 is PCI Compliant to allow storage of cardholder information for the major debit, credit, prepaid, e-purse, ATM, and POS cards. The virtual storage system 100 further includes at least one processor 124 for receiving information including requests from the user at the banking system 70 and processing the requests, such as storing, retrieving and copying electronic documents. The virtual storage system 100 further includes at least one storage server 125 comprising a plurality of physical storage devices 126 for storing files such as documents, audio files, photographs, movies, and images received from the user via the banking system 70. The virtual storage system 100 acts as a safe deposit box for receiving and securely storing the files received from the user via the banking system 70. Although only one processor 124 and two storage devices 126 are shown, the present invention is not limited hereto, and may vary accordingly.

As shown in FIG. 1, the virtual storage system 100 includes a web interface (e.g., the web interface 122) however the present invention is not limited to this particular configuration, and may vary accordingly.

Figure 2:
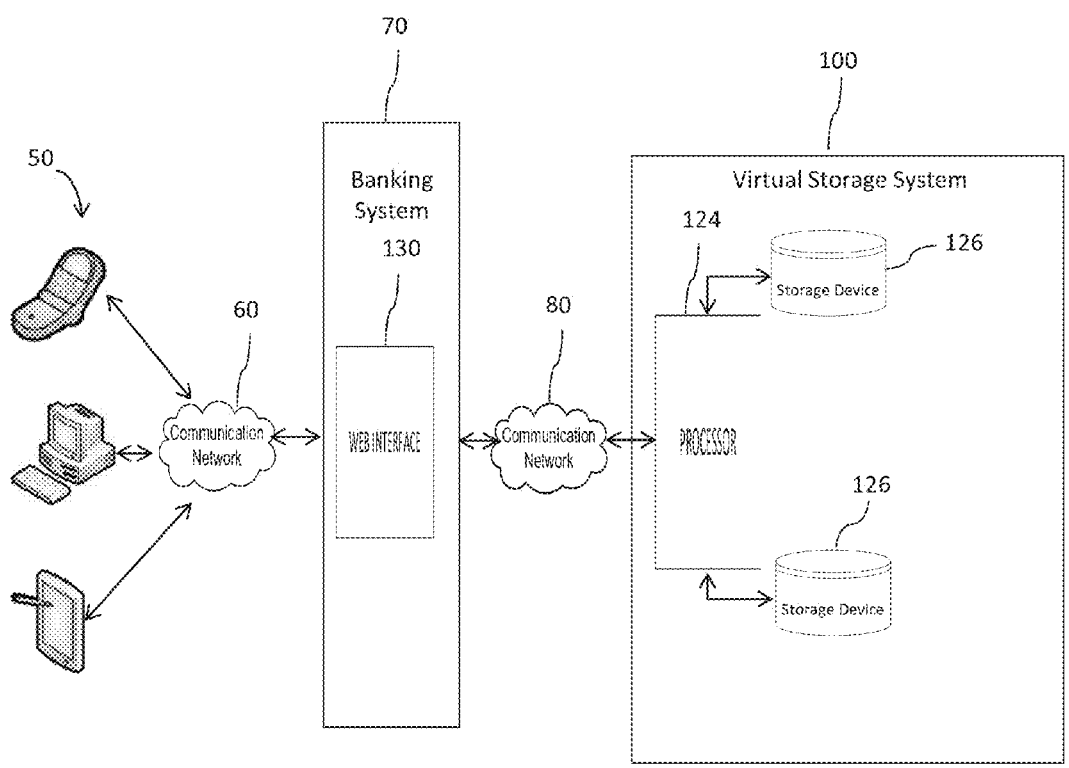
FIG. 2 is a block diagram of a virtual storage system that can be implemented within alternative embodiments of the present invention.
Figure 3:
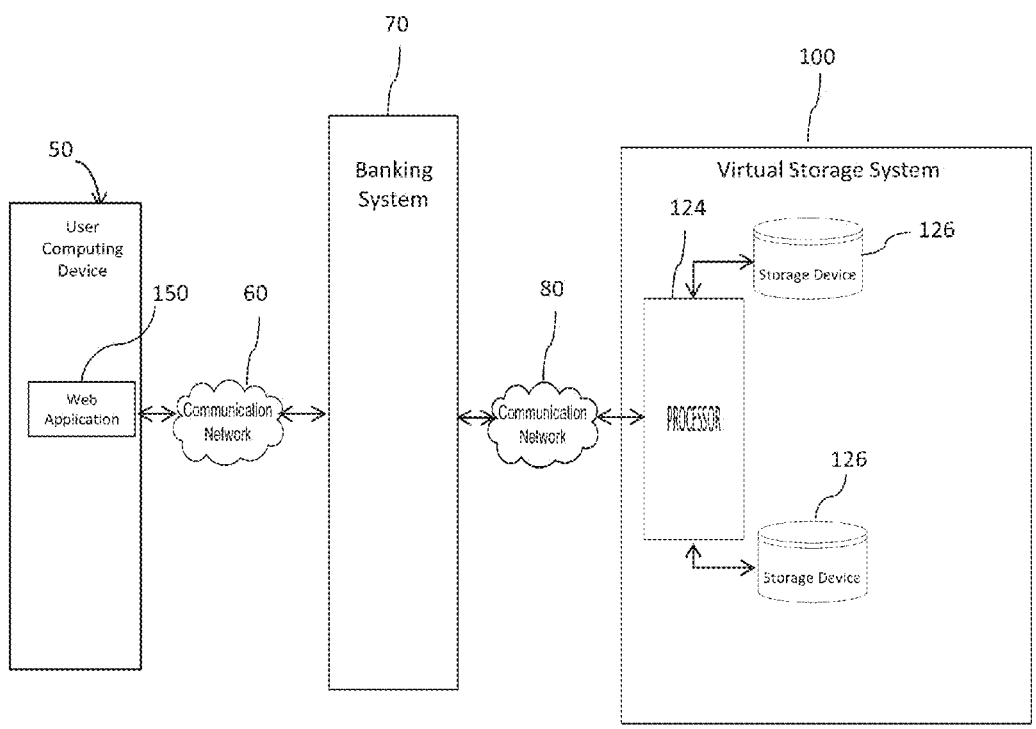
FIG. 3 is a block diagram of a virtual storage system that can be implemented within alternative embodiments of the present invention.
Figure 4:
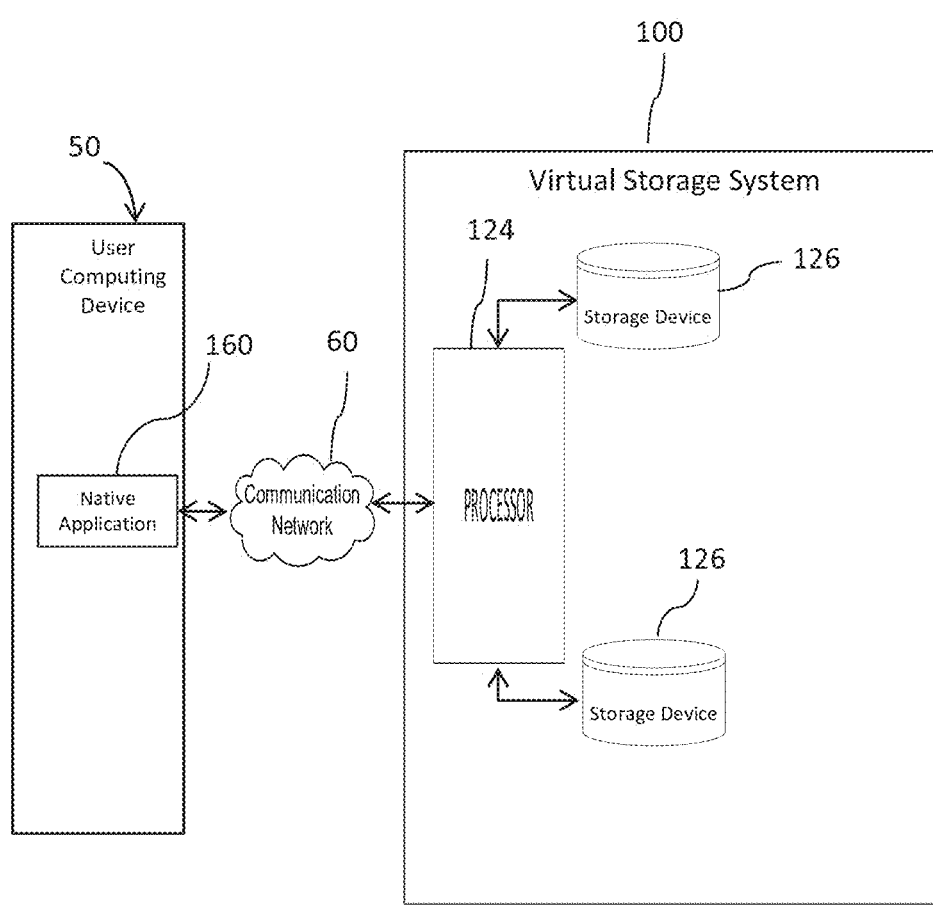
FIG. 4 is a block diagram of a virtual storage system that can be implemented within alternative embodiments of the present invention.

FIGS. 2 through 4 illustrate alternative configurations of the virtual storage system 100, and communication between the virtual storage system 100, the external system (e.g., the banking system 70), and/or the user computing device 50 according to other embodiments of the present invention that may be implemented. Some of the components shown in FIGS. 2 through 4 are the same as the components discussed above with reference to FIG. 1 therefore a detailed description of these components is omitted.

As shown in FIG. 2, in an alternative embodiment, the banking system 70 includes a web interface 130 configured to interface the banking system 70 with the virtual storage system 100 over the communication network 80. The web interface 130 functions in a similar manner as the web interface 122 of the virtual storage system 100 therefore in this embodiment, the web interface 122 of the virtual storage system 100 is omitted.

As shown in FIG. 3, in another alternative embodiment, the user computing device 50 includes a web application 150 (e.g., a web API) for connecting to the banking system 70 and the virtual storage system 100 indirectly through the banking system 70. The web application 150 is an internet-enabled application, for example, that has specific functionality for the user computing device 50 (e.g., a mobile phone). The web application 150 is accessed through a web browser of the user computing device 50 and does not require downloading and installing thereof onto the user computing device 50.

As shown in FIG. 4, in yet another alternative embodiment, the user computing device 50 includes a native application 160 for connecting directly to web services (i.e., the processor 124) of the virtual storage system 100. The native application 160 is directly installed on the user computing device 50 to allow the user to gain direct access to the virtual storage system 100. The native application 160 is a specifically-designed API for accessing the virtual storage system 100. For example, if the user computing device 50 is a tablet, the tablet may include a tablet API for directly accessing the web services of the virtual storage system 100. Therefore, in this embodiment, the web interface 130 of the banking system 70 as shown in the embodiment illustrated in FIG. 2; and the web interface 122 of the virtual storage system 100 as shown in FIG. 3 are omitted.

According to one or more embodiments, the native application 160 may include a multi-factor authentication process to be performed at many levels to enable a user to gain direct access to the virtual storage system 100 from the user computing device 50. The multi-factor authentication process may include steps such as sending login information (e.g., user ID and password information) in a correspondence (e.g., a text message or email) to the user, and providing a time-based one-time password system to the user via a third party.

According to another embodiment, a single-factor authentication process may be used to gain access to the virtual storage system 100 via the external system (e.g., the banking system 70) since the external system and the virtual storage system 100 communicate via a secure connection on the communication network 80.

Figure 10:
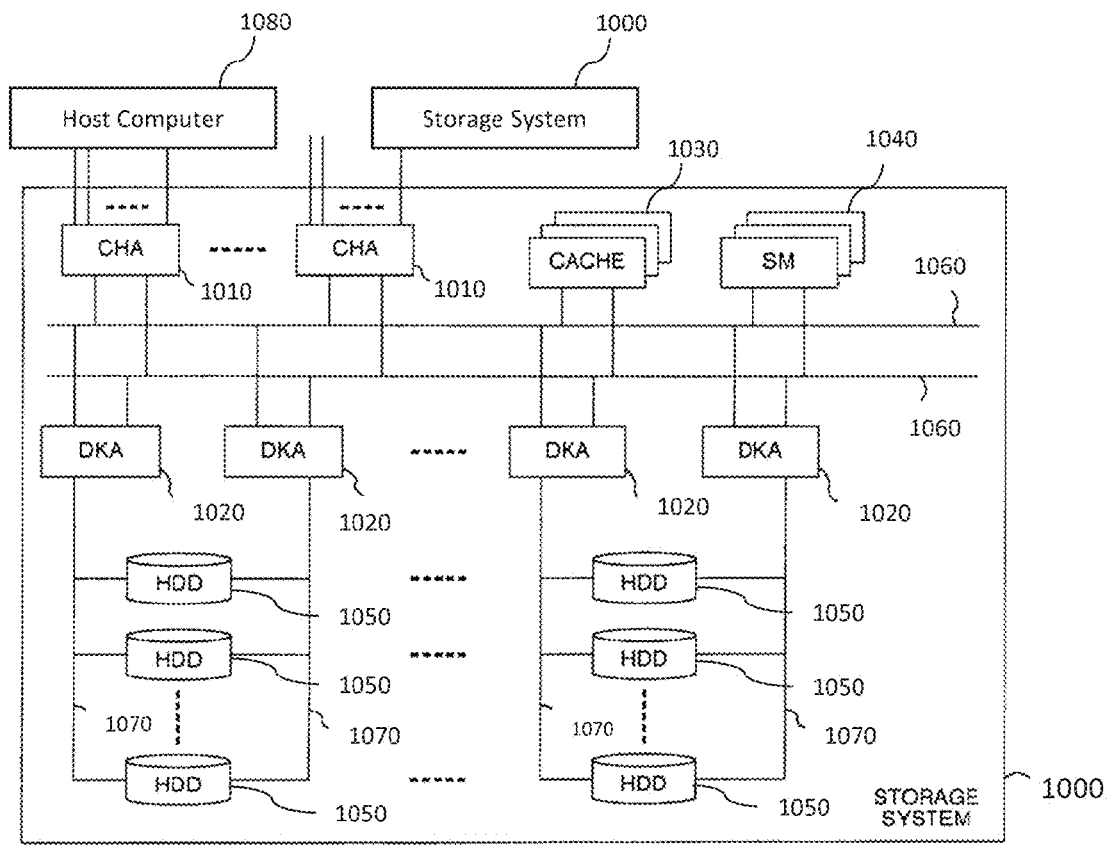
FIG. 10 is a block diagram of an exemplary physical storage system for implementation of the virtual storage system in accordance with one or more embodiments of the present invention.

It should be noted that the virtual storage system is implemented on a physical storage system 1000 such as that illustrated in FIG. 10.

As shown in FIG. 10, the physical storage system 1000 includes a plurality of host adapters (CHA) 1010, disk adapters (DKA) 1020, cache memories (CACHE) 1030, shared memories (SM) 1040, and hard disk drives (HDD) 1050 connected with each other via common paths 1060 and connection lines 1070. Each of the hard disk drives (HDD) 1050 is connected to two disk adapters 1020, for example, using different connection lines 1070. The host adapters 1010 control data transfer between host computers 1080, the cache memories 1030 and the hard disk drives 1050. The cache memories 1030 temporarily store data received from the host computer 1080 and data read from the hard disk drives 1050. The shared memories 1040 are shared between the host adapters 1010 and the disk adapters 1020. The present invention is not limited to any particular number of host adapters 1010, disk adapters 1020, cache memories 1030, shared memories 1040 and hard disk drives 1050, and may vary accordingly. The physical storage system 1000 is one example of a physical storage system for which the virtual storage system can be implemented thereon. The present invention is not limited to a particular configuration of the physical storage system. According to other embodiments, the hard disk drives (HDD) 1050 can be replaced with a flash storage, RAM disks or rotated disk drives, for example. The host computers 1080 can be the processor 124 or a separate computer, for example. Further, the virtual storage system 100 can be implemented on any type of storage system such as a network-attached storage (NAS), a storage area network (SAN), or a distributed memory array.

According to one or more embodiments, the physical storage devices of the physical storage system 1000 as described above can be configured in a RAID (Redundant Array of Independent Disks) configuration. Further, the reliability of the data stored in the storage devices 126 of the virtual storage system 100 can be stored in a redundant manner in redundant data centers using mirroring, remote copy, or the like. The use of redundant storage devices enables the data stored to be duplicated thereby preventing data loss.

When a user accesses the banking system 70 via a bank server, the user can be automatically directed to the virtual storage system 100 when desired.

As shown in FIGS. 1 through 4, the user computing device 50, banking system 70 and virtual storage system 100 can be connected with each other via the communication networks 60 and 80. According to one embodiment, the user computing device 50 may occasionally connect to the communication network 60 while the banking system 70 and the virtual storage system 100 may maintain a connection to the communication networks 60 and 80. Further, in FIG. 4 the user computing device 50 and the virtual storage system 100 are in direct communication with each other over the communication network 80.

According to alternative embodiments, the virtual storage system 100 can be included within the banking system 70 or the user computing device 50 as installable software.

Figure 5:
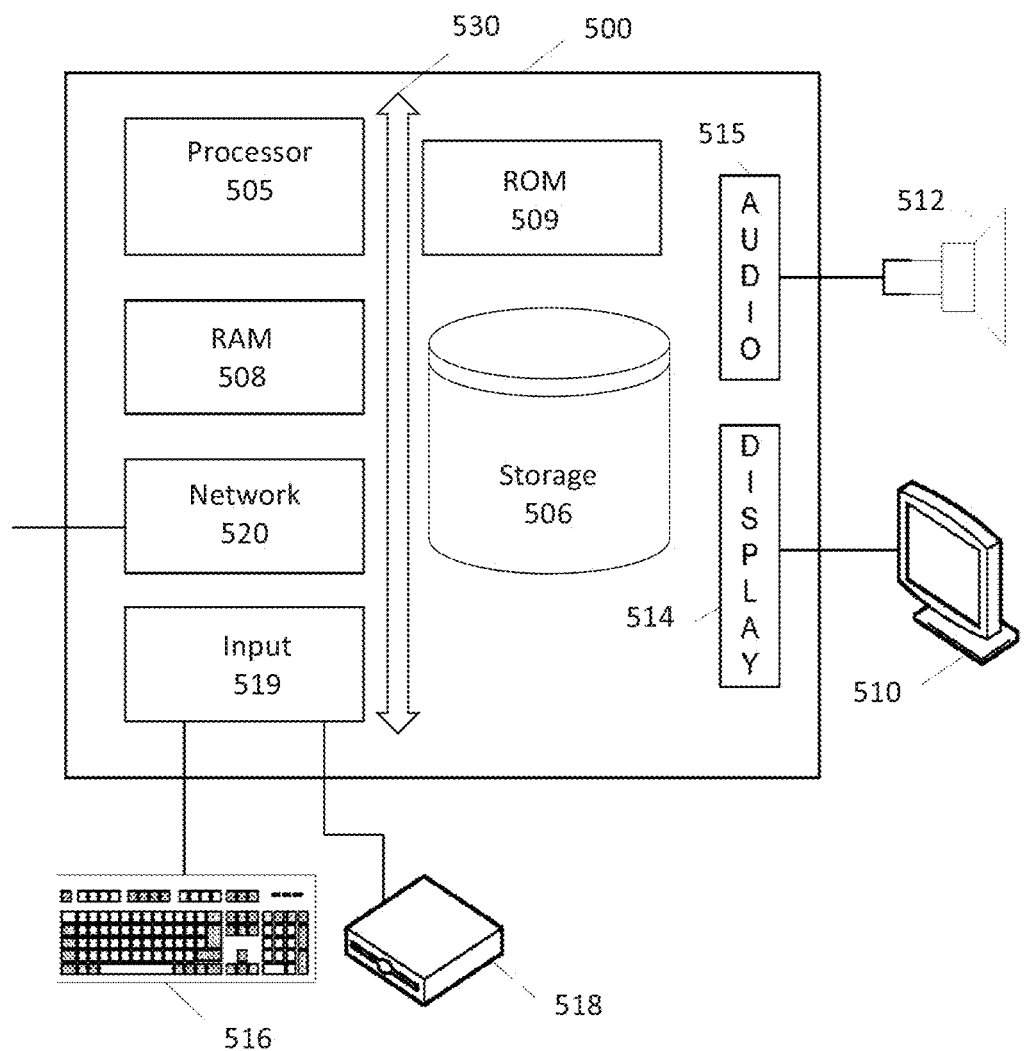
FIG. 5 is a block diagram of an exemplary computer to be implemented within one or more embodiments of the present invention.

FIG. 5 is a block diagram of an exemplary computing device 500 illustrating components of the computing device 50, the banking system 70 and the virtual storage system 100 shown in FIG. 1. As shown in FIG. 5, the computing device 500 includes various components for inputting, outputting, storing and processing data. The computing device 500 includes a processor 505 for performing tasks including executing one or more applications, retrieving data from a storage device e.g., storage 506, and/or outputting data. The processor 505 can be connected to a Random access memory (RAM) module 508 wherein application data and/or instructions may be temporarily stored. The computing device 500 can further includes a Read Only Memory (ROM) 509 configured to allow data stored thereon to persist after the computing device 500 is turned off and is used for storing an operating system (OS) of the computing device 500. The storage device 506 may also provide storage for data files and may include computer readable mediums e.g., disk drives, optical storage mediums e.g., CD ROM drives, magnetic tape storage systems, and flash memory. The processor 505 is configured to retrieve an application from the storage 506 and store the instructions associated with the application in the RAM module 508, while the processor 505 is executing the application. The computing device 500 further includes output devices e.g., a display device 510, and a speaker 512, for outputting visual and audio data via a display adapter 514 and an audio adapter 515. Further, the computing device 500 includes input devices e.g., a keyboard 516, a storage media drive 518, and microphone each having an associated adapter 519 for converting the input data into computer readable data. The storage media drive 518 enables users to read and write data to and from the storage media.

Further, as shown in FIG. 5, the computing device 500 includes one or more components for receiving and transmitting data over the communication networks 60 and 80. For example, a network adapter 520 is provided for communication with one or more computing devices over an IP network, for example, for transmission of data such as financial data over a bank network. The network adapter 520 may include instructions associated with processing IP network packets and cellular network packets. The components of the computing device 500 are connected via a system bus 530.

Figure 6:
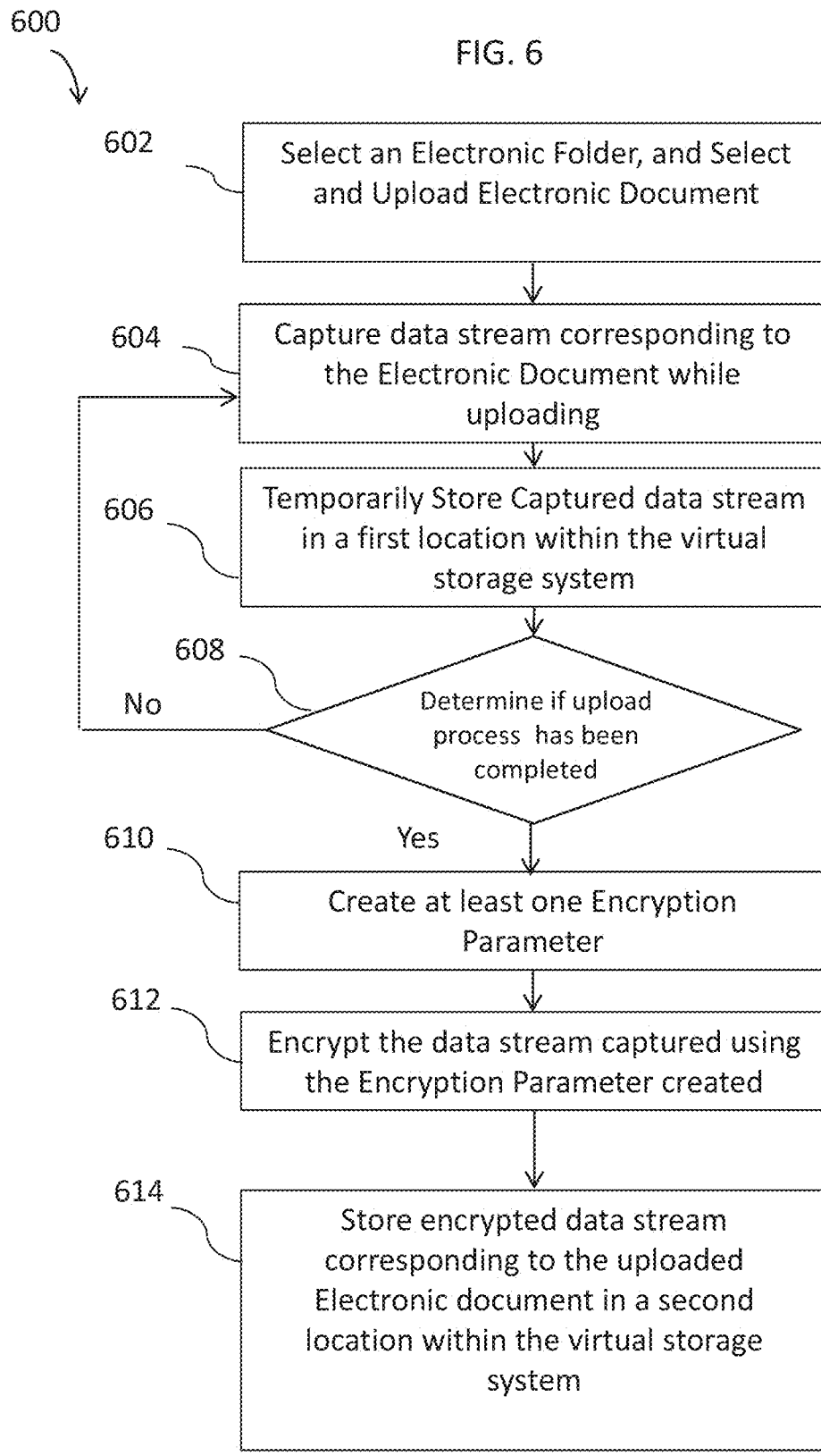
FIG. 6 is a flowchart illustrating a file encryption method implemented by the virtual storage system according to one or more embodiments of the present invention.

FIG. 6 is a flowchart illustrating a file encryption method 600 according to one or more embodiments of the present invention. The method 600 is implemented in software modules for execution by the user computing device 50, the banking system 70 and the virtual storage system 100.

In method 600, an external system (e.g., the banking system 70) or the virtual storage system if accessed directly by the user, receives input data from the user at the user computing device 50 for requesting access to online account information (e.g., banking information) or a plurality of electronic folders within the virtual storage system 100. It is determined whether the user has access rights to the virtual storage system 100. In one or more embodiments, if the user is accessing the virtual storage system 100 indirectly through the banking system 70, access rights of the user may have been established by virtue of the user's access rights to the banking system 70. Thus, a verification process may be performed by the virtual storage system 100 at the banking system 70, via the secure connection over the communication network 80. Alternatively, if the user is accessing the virtual storage system 100 directly via the user computing device 50, access rights of the user may be verified by performing a multi-factor authentication process as discussed above.

At operation 602, the user selects an electronic folder of a plurality of electronic folders to receive an electronic document to be uploaded from an external system. The user further selects the electronic document from an external system, to be uploaded and the uploading process is initiated. From operation 602, the process continues to operation 604, where a data stream corresponding to the electronic document is captured while the electronic document is being uploaded. From operation 604, the process continues to operation 606 where the captured data stream is temporarily stored in a first location within the virtual storage system 100. The first location may be a common location within the redundant physical storage devices 126 of the virtual storage system 100. According to one or more embodiments, as the electronic document is being uploaded the data stream is dynamically captured and stored within the virtual storage system 100. According to one or more embodiments, the data stream corresponding to the electronic document may be captured all at once or in segments of a predetermined data size such as 8 k or 16 k data blocks. From operation 606, the process continues to operation 608 where it is determined via the processor 124, for example, of the virtual storage system 100, whether the uploading process is completed. That is, it is determined whether the data stream is empty. This determination is made by determining how much data remains in the data stream. For example, if less than 8 k of data remains in the data stream then it may be determined that the uploading process is completed. If it is determined in operation 608, that the uploading process is not completed, the process returns to operation 604 where additional data stream(s) (e.g., remaining data blocks if the electronic document is uploaded in segments) corresponding to the electronic document is captured.

If it is determined in operation 608, that the uploading process is completed, the process continues to operation 610 where at least one encryption parameter (e.g., an encryption key) is created corresponding to the file uploaded. According to one or more embodiments, the encryption parameter is a security measure that transforms the data stream(s) captured into an unreadable cipher through various cryptographic algorithms. For example, according to one embodiment, the encryption parameter may be a 128 bit or 256 bit encryption key. According to one or more embodiments, the encryption key may be less than 128 bit or higher than 256 bit. Further, according to another embodiment, the encryption parameter may be a Salt or nonce randomly generated to be used as an additional encryption parameter. The Salt may be an 8 bit or 16 bit randomly generated code automatically encrypting the password before it is saved to the storage device 126 of the virtual storage system 100.

According to one or more embodiments, the encryption parameter is stored in the web services (e.g., processor 124) internal storage (e.g., storage 506 of FIG. 5). Therefore, the electronic document uploaded can only be accessed from a specific storage device 126 of the virtual storage system 100.

From operation 610, the process continues to operation 612 where the data stream captured is encrypted using the at least one encryption parameter created. The process then continues to operation 614, where the encrypted data stream corresponding to the uploaded file is permanently stored in a second location of the redundant physical storage devices 126 within the virtual storage system 100. The electronic document is then viewable within the selected electronic folder of the virtual storage system 100.

The uploaded electronic document is then able to be viewed and accessed from the electronic selected folder of the plurality of electronic folders.

The electronic document is accessible only by the user at the user computing device 50 via the banking system 70 according to one embodiment, or via the virtual storage system 100 directly according to alternative embodiments. The electronic document upload, encryption and format conversion operations are performed via the processor 124 of the virtual storage system 100. According to one or more embodiments, the encryption operation may be performed in one storage location of the virtual storage system 100 (e.g., a first data center), and the uploading operation may be performed in another storage location (e.g., a second data center) of the virtual storage system 100. The present invention is not limited to performing the method of FIG. 6, in a particular order and other variations thereof may be implemented. For example, according to alternative embodiments, the captured data stream (at operation 604) may be encrypted using a first encryption parameter created prior to temporarily storing in the first location (at operation 606), and decrypted and re-encrypted using a second encryption parameter created prior to permanently storing in the second location (at operation 614), to provide added data protection. Another embodiment will now be discussed with reference to FIG. 7.

Figure 7:
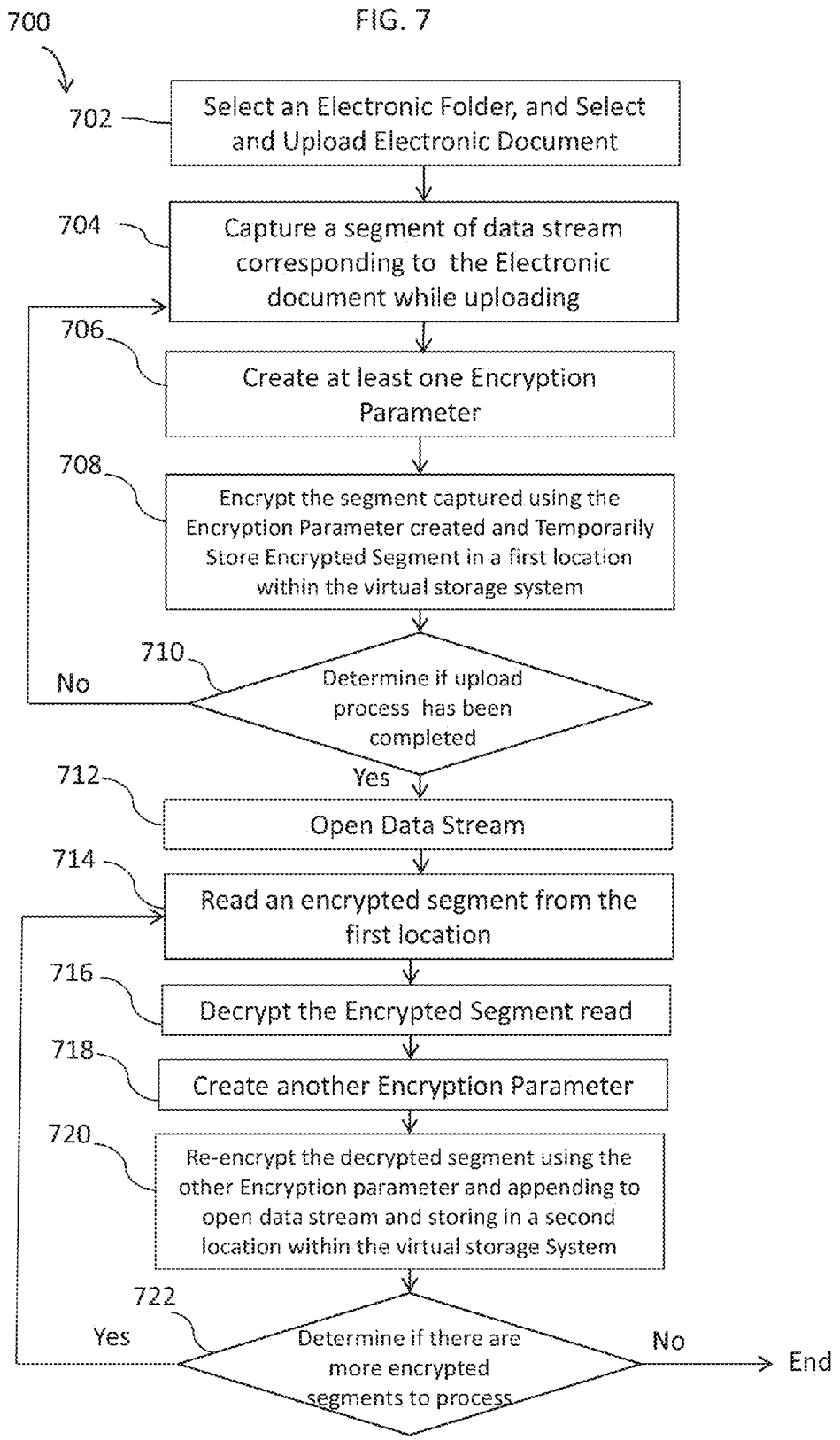
FIG. 7 is a flowchart illustrating a file encryption method implemented according to alternative embodiments of the present invention.

According to other embodiments of the present invention, the file encryption process can be performed on separate data blocks of data stream captured corresponding to the electronic document being uploaded. Therefore, in the event that the uploading process is paused or cancelled, the uploading process may be resumed at any time without loss of captured data, and the data stream previously captured is already uploaded and encrypted by the virtual storage system 100. FIG. 7 is a flowchart illustrating a file encryption method 700 according to one or more embodiments of the present invention. In the method 700, the external system (e.g., the banking system 70) or the virtual storage system if access directly by the user, receives input data from the user at the user computing device 50 for requesting access to online account information or a plurality of electronic folders within the virtual storage system 100. At operation 702, the user selects an electronic folder of the plurality of electronic folders to receive an electronic document to be uploaded from an external system. The user further selects the electronic document to be uploaded and the upload process is initiated by the user. From operation 702, the process continues to operation 703, where a segment of a data stream corresponding to the electronic document, is captured while the electronic document is being uploaded. The segment of the data stream captured is then stored in the virtual storage system 100. According to one embodiment, the data stream is captured in segments of predetermined data size such as 8 k or 16 k data blocks.

From operation 704, the process continues to operation 706 where at least one encryption parameter is created corresponding to the electronic document uploaded. The operation 704 is performed similar to the operation 610 of FIG. 6. Upon creating the at least one encryption parameter (e.g., a first encryption parameter), the process continues to operation 708 where the segment of the data stream captured is encrypted using the at least one encryption parameter created and temporarily stored in a first location within the virtual storage system 100. From operation 708, the process then continues to operation 710 where it is determined whether the uploading process has been completed. If it is determined that the uploading process has not been completed, the process returns to operation 704 where additional segments of the data stream (e.g., remaining data blocks) corresponding to the electronic document are captured.

If it is determined in operation 710, that the uploading process is completed, the process continues to operation 712 where a data stream to a second location within the virtual storage system 100 (e.g., a specific storage device 126 of the plurality of storage devices 126) is opened for receiving data segments associated with the electronic document and for permanently storing of the electronic document as a single continuous file. From operation 712, the process continues to operation 714 where an encrypted segment is read from the first location. From operation 714, the process continues to operation 716 where the encrypted segment read is decrypted via the processor 124. From operation 716, the process continues to operation 718 where another (e.g., a second encryption parameter) is created, the encryption parameter created in operation 718 is then used to re-encrypt the decrypted segment and the re-encrypted segment is appended to the open data stream and stored in a second location (e.g., the specific storage device 126 of the plurality of storage devices 126 within the virtual storage system 100.)

From operation 720, the process continues to operation 722 where it is determined if there are more encrypted segments which were encrypted at operation 708 requiring processing.

If it is determined at operation 722 that more encrypted segments exists, the process returns to operation 714 where another encrypted segment is read from the first location and operations 716-720 are repeated. If it is determined at operation 722 that no more encrypted segments require processing, the method 700 ends. Thus, according to the current embodiment, all of the encrypted segments corresponding to the electronic document which are temporarily stored in the first location are decrypted, re-encrypted, appended to the open data stream, and stored in the second location as a single continuous document corresponding to the electronic document uploaded within the virtual storage system 100. The electronic document can be found within the selected electronic folder of the plurality of electronic folders.

The present invention is described herein in terms of block components, screen shots, and optional selections and processing steps. It should be appreciated that the functional blocks may be realized by any number of hardware and/or software components configured to perform the specified functions. For example, the present invention may employ various integrated circuits e.g., memory elements, processing elements, logic elements, look-up tables, and others which may perform the functions under the control of one or more processors or other control devices. The software components can be implemented with any programming or scripting language, with various algorithms implemented with data structures, objects, processes, and other programming elements.

An exemplary file selection operation of the methods of FIGS. 6 and 7 will be described with reference to the screen shots shown in FIGS. 8 and 9.

Figure 8:
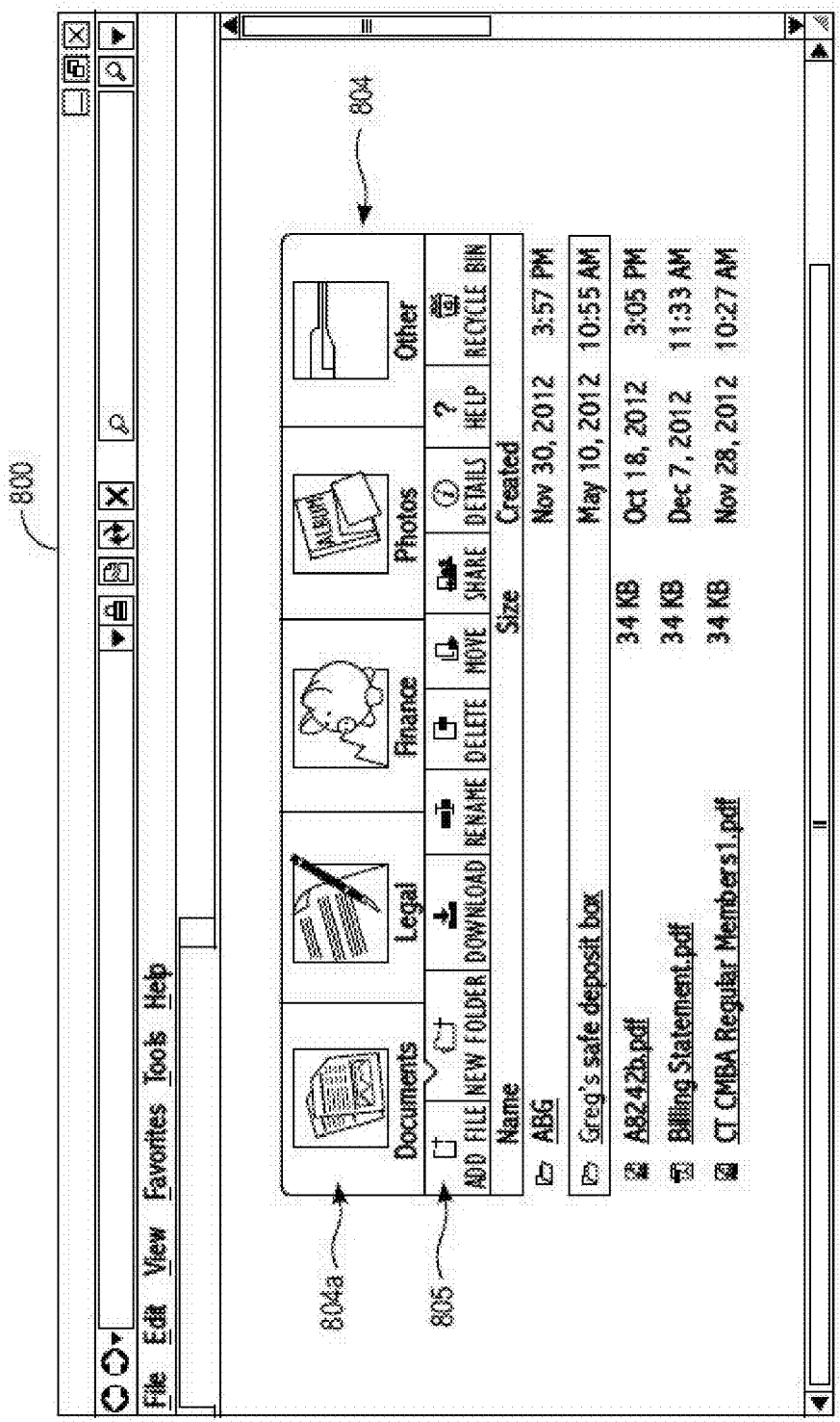
FIG. 8 is a screen shot of the virtual storage system that can be implemented within one or more embodiments of the present invention.

As shown in FIG. 8, the screen shot 800 of the virtual storage system 100 accessed by the user via the user computing device 50. As shown, the screen shot 800 is implemented for example, via a web page for network transmission. The web page may include standard HTML documents, and various forms JAVA® applets, active server pages (ASP), common gateway interface scripts (CGI), extensive markup language (SML), dynamic HTML, plugins, etc.

The user can select and view electronic documents uploaded and stored within a plurality of electronic folders 804 (including a documents folder, a legal folder, a finance folder, and a photos folder, for example. In this embodiment, the user selects the documents folder 804a to add (i.e., upload) an electronic document thereto. The user then selects "add file" link 805 to initiate a file selection operation as shown in FIG. 9.

Figure 9:
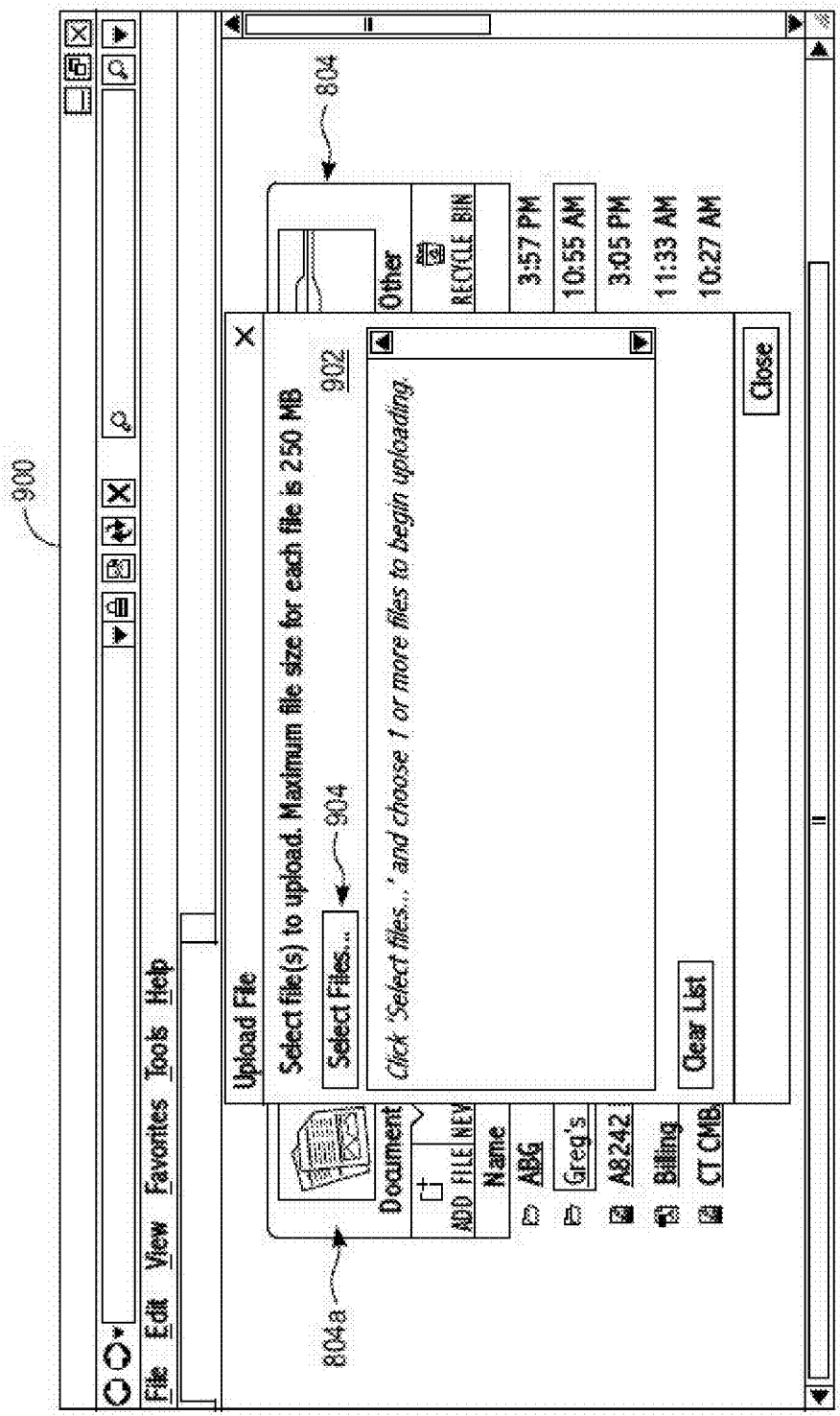
FIG. 9 is a screen shot of a file selection operation of the file encryption method of FIGS. 6 and 7 that can be implemented within one or more embodiments of the present invention.

FIG. 9 is a screen shot 900 of a file selection operation of the file encryption method according to one or more embodiments of the present invention. As shown, the user views a select file dialog window 902, where the user is prompted to select a file to be uploaded. The user selects a "select file" link 904 and is then able to select an electronic document stored within an external system (e.g., the user computing device 50) to be uploaded. Upon selecting the electronic document to be uploaded, the uploading process is initiated and operations 604 through 614 of the file encryption method 600 of FIG. 6 or operation 704 through 712 of the file encryption operation of FIG. 7 are performed.

In view of the above, the present method embodiment may therefore take the form of a computer or controller implemented processes and apparatuses for practicing those processes. This disclosure can also be embodied in the form of computer program code containing instructions embodied in tangible media, such as floppy diskettes, CD ROMs, hard drives, or any other computer-readable storage medium, wherein, when the computer program code is loaded into and executed by a computer or controller, the computer becomes an apparatus for practicing the invention. This disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above.

According to one or more embodiments, a virtual storage system in data communication with a user computing device via a communication network is provided. The virtual storage system comprising at least one processor configured to capture a data stream corresponding to an electronic document retrieved from an external system, to be uploaded to the virtual storage system, and create at least one encryption parameter and encrypt the data stream captured using the at least one encryption parameter created, and a plurality of redundant physical storage devices in data communication with the at least one processor and each configured to store the encrypted data stream corresponding to the electronic document.

According to one or more embodiments, a method implemented by computer system to effect the encryption of electronic documents to be uploaded into a virtual storage system including a plurality of redundant physical storage devices and in data communication via a communication network, with an external system is provided. The method comprising receiving input data for accessing the virtual storage system directly or indirectly via the external system, selecting an electronic folder of a plurality of folders within the virtual storage system to receive an electronic document to be uploaded from the external system, and selecting the electronic document to be uploaded, initiating an uploading process for uploading the electronic document, capturing a data stream corresponding to the electronic document to be uploaded, while performing the uploading process, and storing the data stream captured within the virtual storage system, determining whether the uploading process is complete, creating at least one encryption parameter, when it is determined that the uploading process is complete, and encrypting the data stream captured using the at least one encryption parameter created, and storing the encrypted data stream captured within the virtual storage system.

According to one or more embodiments, a method implemented by computer system to effect the encryption of electronic documents to be uploaded into a virtual storage system including a plurality of redundant physical storage devices and in data communication via a communication network, with external system is provided. The method comprising receiving input data for accessing the virtual storage system directly or indirectly via the external system, selecting an electronic folder of a plurality of folders within the virtual storage system to receive an electronic document to be uploaded from the external system, and selecting the electronic document to be uploaded, initiating an uploading process for uploading the electronic document, capturing a segment of a data stream corresponding to the electronic document to be uploaded, while performing the uploading process, and storing the segment of the data stream captured within the virtual storage system, creating at least one encryption parameter, and encrypting the segment of the data stream captured using the at least one encryption parameter created, and storing the encrypted segment of the data stream captured within the virtual storage system, determining whether the uploading process is complete, and capturing and encrypting another segment of the data stream when it is determined that the uploading process is not complete.

According to one or more embodiments, a computer readable medium storing computer executable instructions that, when executed, cause a computing device to perform a file encryption method for encrypting electronic documents to be uploaded into a virtual storage system including a plurality of redundant physical storage devices and in data communication via a communication network, with an external system is provided. The method comprising receiving input data for accessing the virtual storage system directly or indirectly via the external system, selecting an electronic folder of a plurality of folders within the virtual storage system to receive an electronic document to be uploaded from the external system, and selecting the electronic document to be uploaded, initiating an uploading process for uploading the electronic document, capturing a data stream corresponding to the electronic document to be uploaded, while performing the uploading process, and storing the data stream captured within the virtual storage system, determining whether the uploading process is complete, creating at least one encryption parameter, when it is determined that the uploading process is complete, and encrypting the data stream captured using the at least one encryption parameter created, and storing the encrypted data stream captured within the virtual storage system.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A virtual storage system in data communication with a user computing device via a communication network, the virtual storage system comprising:
    at least one processor configured to:
        capture a data stream corresponding to an electronic document retrieved from an external system, to be uploaded to the virtual storage system, and
        encrypt the captured data stream using an encryption parameter; and
    a plurality of redundant physical storage devices in data communication with the at least one processor, comprising:
        a first data location temporarily storing the captured data stream, and
        a second data location permanently storing the encrypted data stream.

2. The virtual storage system of claim 1, further comprising a web services unit comprising:
    at least one web services processor configured to:
        transmit a web interface to the user computing device, and
        Interface the virtual storage system with the external system and the user computing device, via at least one communication network; and
    an internal storage unit storing the encryption parameter.

3. The virtual storage system of claim 1, wherein the external system comprises a web services unit, comprising:
    at least one web services processor configured to:
        transmit a web interface to the user computing device, and
        interface the virtual storage system with the external system and the user computing device, via at least one communication network; and
    an internal storage unit storing the encryption parameter.

4. The virtual storage system of claim 1, wherein the user computing device comprises a web application configured to interface the user computing device with the virtual storage system, via the external system.

5. The virtual storage system of claim 1, wherein the user computing device comprises a native application configured to interface the user computing device directly with the virtual storage system.

6. The virtual storage system of claim 1, wherein the external system is an online document retrieval and storage system.

7. The virtual storage system of claim 6, wherein the online document retrieval and storage system is a banking system and the electronic document is a bank statement.

8. The virtual storage system of claim 1, wherein the data stream corresponding to the electronic document is captured and encrypted in segments of a predetermined data size.

9. The virtual storage system of claim 1, wherein the least one processor configured to capture the data stream is further configured to temporarily encrypt the captured data stream using another encryption parameter prior and store the temporarily encrypted captured data stream in the first data location; and
    wherein the least one processor configured to encrypt the captured data stream is further configured to decrypting the temporarily encrypted captured data stream stored in the first data location, re-encrypting the decrypted data using the encryption parameter and permanently storing the re-encrypted data stream in the second data location.

10. The virtual storage system of claim 1, wherein the first data location resides in a first data center and the second data location resides in another data center.

11. A method implemented by a computer system to effect the encryption of electronic documents uploaded into a virtual storage system including a plurality of redundant physical storage devices and in data communication via a communication network, with an external system, the method comprising:
    capturing a data stream comprising at least one segment of an electronic document to be uploaded;
    temporarily storing the captured data stream in a first location in the plurality of redundant physical storage devices;
    encrypting the captured data stream captured using an encryption parameter; and
    permanently storing the encrypted data stream in a second location in the plurality of redundant physical storage devices.

12. The method of claim 11, wherein the a virtual storage system further comprises a web services unit comprising an internal storage unit and the encryption parameter is stored on the internal storage unit of the web services unit.

13. The method of claim 11, wherein the external system is a banking system and the electronic document is a bank statement.

14. The method of claim 11, further comprising determining when the uploading process is complete, wherein when it is determined that the uploading process is complete, the method further comprises:
opening a data stream to a third location of the plurality of redundant physical storage devices within the virtual storage system;
reading an encrypted segment from the second location;
decrypting the encrypted segment read;
creating another encryption parameter;
re-encrypting the decrypted segment using the other encryption parameter, and appending the re-encrypted segment to the open data stream; and
permanently storing the re-encrypted segment corresponding to the electronic document in the third location of the plurality of redundant physical storage devices within the virtual storage system.

15. The method of claim 14, wherein if the uploading process is cancelled, storing the encrypted segment of the data stream within the virtual storage system.

16. The method of claim 11, wherein capturing the data stream further comprises temporarily encrypting the captured data stream using another encryption parameter prior to storing the temporarily encrypted captured data stream in the first data location; and
wherein encrypting the captured data stream further comprises decrypting the temporarily encrypted captured data stream stored in the first data location, re-encrypting the decrypted data using the encryption parameter and storing the re-encrypted data stream in the second data location.

17. The method of claim 11, wherein the first data location resides in a first data center and the second data location resides in another data center.

18. A non-transitory computer readable medium storing computer executable instructions that, when executed, cause a computing device to perform a file encryption method for encrypting electronic documents to be uploaded into a virtual storage system including a plurality of redundant physical storage devices and in data communication via a communication network, with an external system, the method comprising:
capturing a data stream comprising at least one segment of an electronic document to be uploaded;
temporarily storing the captured data stream in a first location in the plurality of redundant physical storage devices;
encrypting the captured data stream captured using an encryption parameter; and
permanently storing the encrypted data stream in a second location in the plurality of redundant physical storage devices.

19. The non-transitory computer readable medium of claim 18, wherein capturing the data stream further comprises temporarily encrypting the captured data stream using another encryption parameter prior to storing the temporarily encrypted captured data stream in the first data location; and
wherein encrypting the captured data stream further comprises decrypting the temporarily encrypted captured data stream stored in the first data location, re-encrypting the decrypted data using the encryption parameter and storing the re-encrypted data stream in the second data location.

20. The non-transitory computer readable medium of claim 18, wherein the first data location resides in a first data center and the second data location resides in another data center.

* * * * *